(12) United States Patent
Cole et al.

(10) Patent No.: US 11,204,437 B2
(45) Date of Patent: Dec. 21, 2021

(54) DIPOLE LOCATOR USING BALANCED ANTENNA SIGNALS

(71) Applicant: The Charles Machine Works, Inc., Perry, OK (US)

(72) Inventors: Scott B. Cole, Edmond, OK (US); Klayton Day Jones, Perry, OK (US); David R. Brown, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 123 days.

(21) Appl. No.: 16/672,937

(22) Filed: Nov. 4, 2019

(65) Prior Publication Data

US 2020/0142089 A1   May 7, 2020

Related U.S. Application Data

(60) Provisional application No. 62/755,643, filed on Nov. 5, 2018.

(51) Int. Cl.
| | | |
|---|---|---|
| *G01V 3/10* | (2006.01) | |
| *G01V 3/38* | (2006.01) | |
| *G01V 3/165* | (2006.01) | |

(52) U.S. Cl.
CPC .............. *G01V 3/107* (2013.01); *G01V 3/165* (2013.01); *G01V 3/38* (2013.01)

(58) Field of Classification Search
CPC .......... G01V 3/107; G01V 3/38; G01V 3/165; G01V 3/30; G01R 33/045; E21B 47/0228
USPC ........................................................ 324/219
See application file for complete search history.

(56) References Cited

U.S. PATENT DOCUMENTS

| | | |
|---|---|---|
| 4,542,344 A | 9/1985 | Darilek et al. |
| 4,742,356 A | 5/1988 | Kuipers |
| 4,766,383 A | 8/1988 | Fox et al. |
| 5,397,986 A | 3/1995 | Conway et al. |

(Continued)

FOREIGN PATENT DOCUMENTS

| | | |
|---|---|---|
| DE | 4542344 A1 | 10/1996 |
| EP | 1526606 A1 | 4/2005 |

(Continued)

OTHER PUBLICATIONS

United Kingdom Intellectual Property Office "Examination Report under Section 18(3)" Jan. 22, 2021, 2 pages, United Kingdom.

(Continued)

*Primary Examiner* — Christopher P McAndrew
(74) *Attorney, Agent, or Firm* — Tomlinson McKinstry, P.C.

(57) ABSTRACT

An antenna arrangement. The arrangement uses four conductive loops, each within a distinct plane from the other conductive loops. The four conductive loops have a common center point. Each loop is within a dipole magnetic field, and detects a component thereof. By balancing the signals received between matched pairs of the conductive loops, the difference between the signals can be used to guide the antenna arrangement to a null point—that is—a point in the magnetic field where each pair of conductive loops is balanced. The antenna arrangement can further be used to determine the depth of the dipole field source using the magnitude of the field.

21 Claims, 13 Drawing Sheets

(56) References Cited

U.S. PATENT DOCUMENTS

| | | | |
|---|---|---|---|
| 5,558,091 A * | 9/1996 | Acker | A61B 5/062 |
| | | | 600/424 |
| 5,640,092 A | 6/1997 | Motazed et al. | |
| 5,699,048 A | 12/1997 | Galloway | |
| 6,005,532 A | 12/1999 | Ng | |
| 6,035,951 A | 3/2000 | Mercer et al. | |
| 6,563,474 B2 | 5/2003 | Nantz et al. | |
| 6,737,867 B2 | 5/2004 | Brune et al. | |
| 6,776,246 B1 | 8/2004 | Nickel et al. | |
| 6,865,455 B1 | 3/2005 | Wiegert | |
| 6,882,154 B2 | 4/2005 | Mercer et al. | |
| 6,924,767 B2 | 8/2005 | Kitahara et al. | |
| 7,009,399 B2 | 3/2006 | Olsson et al. | |
| 7,013,990 B1 | 3/2006 | Nickel et al. | |
| 7,042,411 B2 | 5/2006 | Yagi et al. | |
| 7,443,154 B1 * | 10/2008 | Merewether | G01V 3/08 |
| | | | 324/67 |
| 7,786,731 B2 * | 8/2010 | Cole | E21B 47/0232 |
| | | | 324/326 |
| 7,952,357 B2 | 5/2011 | Cole | |
| 8,928,323 B2 * | 1/2015 | Cole | H01Q 1/04 |
| | | | 324/326 |
| 9,207,350 B2 * | 12/2015 | Olsson | G01V 3/081 |
| 9,329,297 B2 * | 5/2016 | Cole | E21B 47/0232 |
| 9,488,747 B2 * | 11/2016 | Olsson | G01V 3/165 |
| 9,632,199 B2 * | 4/2017 | Olsson | G01S 19/13 |
| 10,211,523 B2 * | 2/2019 | Tishin | H01Q 7/00 |
| 10,374,318 B2 * | 8/2019 | Moldovan | H01Q 13/16 |
| 10,459,105 B2 | 10/2019 | Cole et al. | |
| 10,629,991 B2 * | 4/2020 | Lee | H01Q 21/29 |
| 2002/0020559 A1 | 2/2002 | Barbera et al. | |
| 2004/0070399 A1 | 4/2004 | Olsson et al. | |
| 2004/0070535 A1 | 4/2004 | Olsson et al. | |
| 2009/0153141 A1 | 6/2009 | Mercer | |
| 2009/0219027 A1 * | 9/2009 | Morrison | G01V 3/104 |
| | | | 324/326 |
| 2015/0323696 A1 * | 11/2015 | Cole | G01V 3/15 |
| | | | 324/326 |
| 2017/0362931 A1 * | 12/2017 | Homan | E21B 17/023 |
| 2019/0097321 A1 * | 3/2019 | Lee | H01Q 21/29 |

FOREIGN PATENT DOCUMENTS

| | | |
|---|---|---|
| JP | 2003249816 A1 | 9/2003 |
| SU | 1509133 A1 | 9/1989 |
| WO | 9530913 A1 | 11/1995 |
| WO | 0010456 A1 | 3/2000 |

OTHER PUBLICATIONS

United Kingdom Intellectual Property Office "Combined Search and Examination Report under Section 17 & 18(3)" dated Apr. 29, 2020, 5 pages, United Kingdom.

* cited by examiner

DIPOLE LOCATOR USING BALANCED ANTENNA SIGNALS

SUMMARY

The present invention is directed to an antenna having four conductive loops, each of the four conductive loops situated within a single plane and having a center, in which the centers of the four loops coincide and which none of the planes of the four loops coincide.

The present invention is also directed to an above-ground antenna arrangement having first, second, third and fourth conductive loops. The second conductive loop is surrounded by the first conductive loop. The fourth conductive loop is surrounded by the third conductive loop. Each of the first, second, third and fourth conductive loops are planar and define separate planes. Each of the first, second, third and fourth conductive loops have a common centerpoint.

The present invention is further directed to an antenna assembly comprising a first, second, third and fourth conductive loop. Each loop is situated in a plane and defines a normal vector normal to the plane and extending through the centerpoint of the loop. The centerpoints of the first, second, third and fourth loops are coincident, and the first, second, third and fourth normal vectors are distinct.

BRIEF DESCRIPTION OF THE DRAWINGS

In FIG. 11, the support structure is removed and normal vectors of the various antenna components are shown. The vector normal to antenna 30 is disposed into and out of the page.

DETAILED DESCRIPTION

Figure 1:
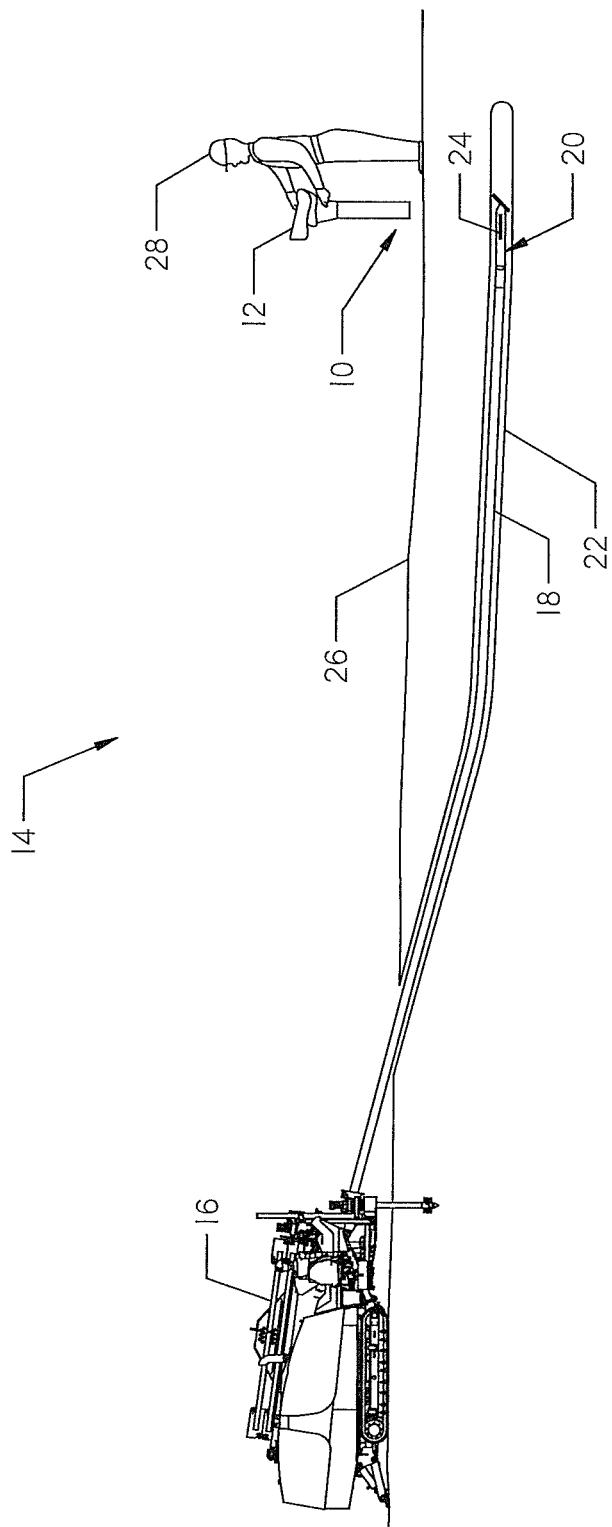
FIG. 1 is an illustration of a horizontal directional drilling system for drilling a horizontal borehole.

The present invention is directed to an antenna arrangement 10, shown in FIGS. 2-11, for use with a tracker 12 used in horizontal directional drilling operations. In FIG. 1, a horizontal directional drilling system 14 is shown. The system 14 uses a drill rig 16 to advance a drill string 18 carrying a downhole tool 20 underground to create a borehole 22. A beacon 24 positioned within the downhole tool 20 emits a beacon signal. The tracker 12, positioned on or above the ground surface 26, detects the beacon signal and communicates the beacon's position to a tracker operator 28. The tracker 12 detects the beacon signal using multiple antennas, as shown herein.

Figure 2:
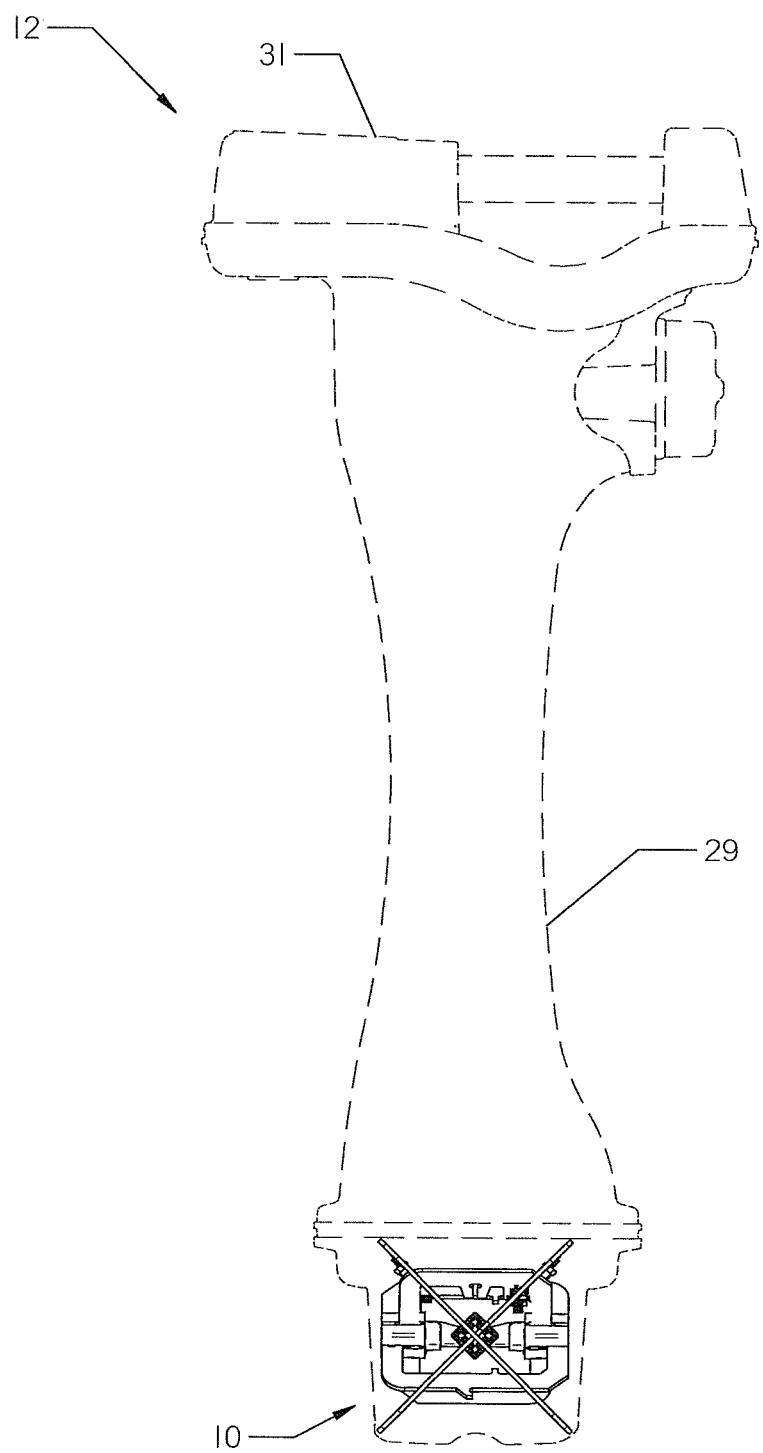
FIG. 2 is an illustration of a tracker utilizing an antenna arrangement to detect a below ground magnetic field source. The tracker is shown in phantom such that the antenna arrangement is visible.

With reference to FIG. 2, a representative tracker 12 is shown. Typically, the antenna arrangement 10 is disposed on the tracker 12 at a bottom end of its frame 29. A processor (not shown) is utilized in the tracker to interpret signals received by the antenna arrangement 10. A display 31 may be disposed at the top end of the frame 29 to help the operator 28 (FIG. 1) visualize information about the field generated at the beacon 24. In addition or in the alternative, the tracker 12 may communicate this information with the drill 16. While one antenna arrangement 10 is disposed in the tracker 12 in FIG. 2, multiple antenna arrangements may be used together on a single tracker, either vertically or horizontally displaced on the frame 29.

Figure 6:
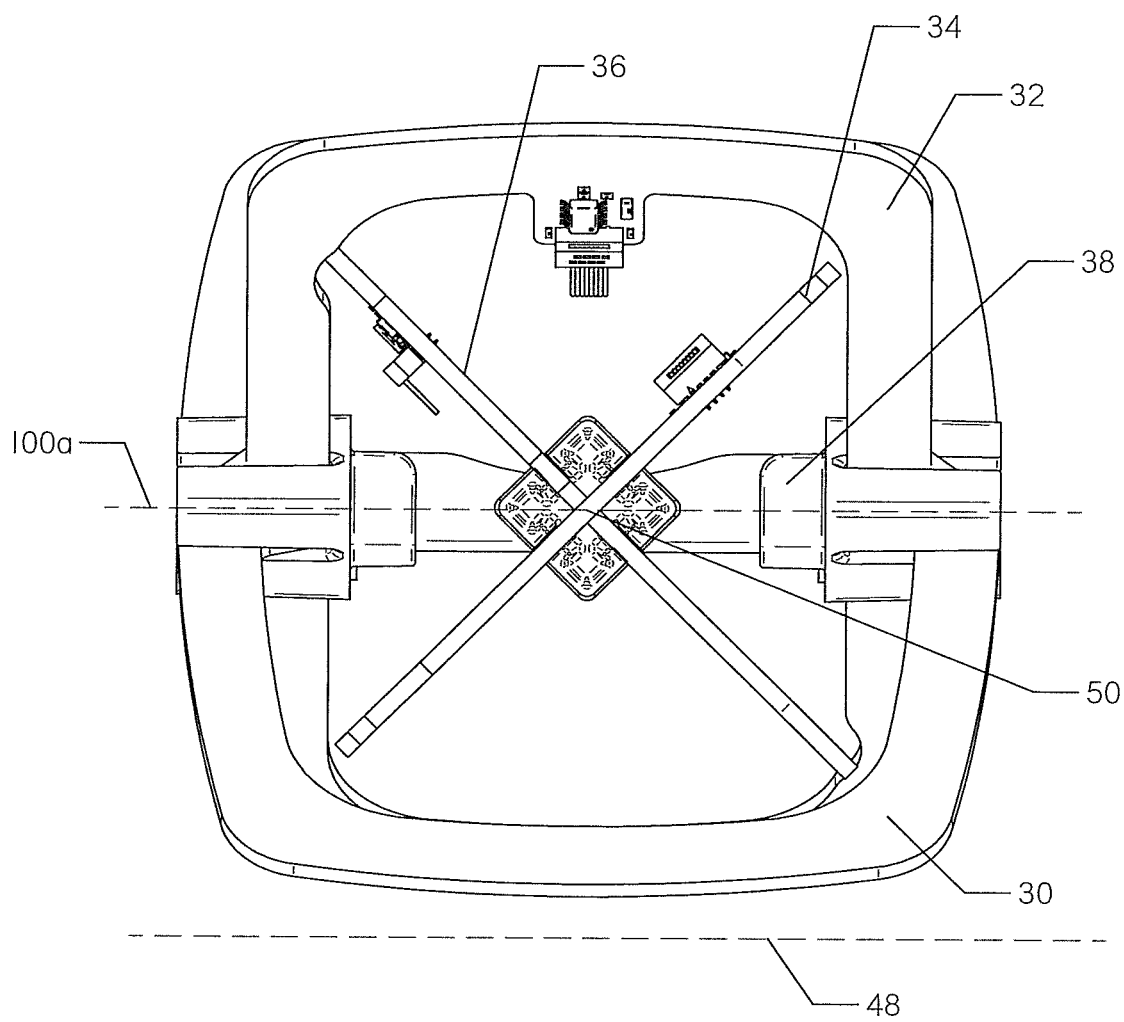
FIG. 6 is a front elevation view of the antenna arrangement of FIG. 3.
Figure 7:
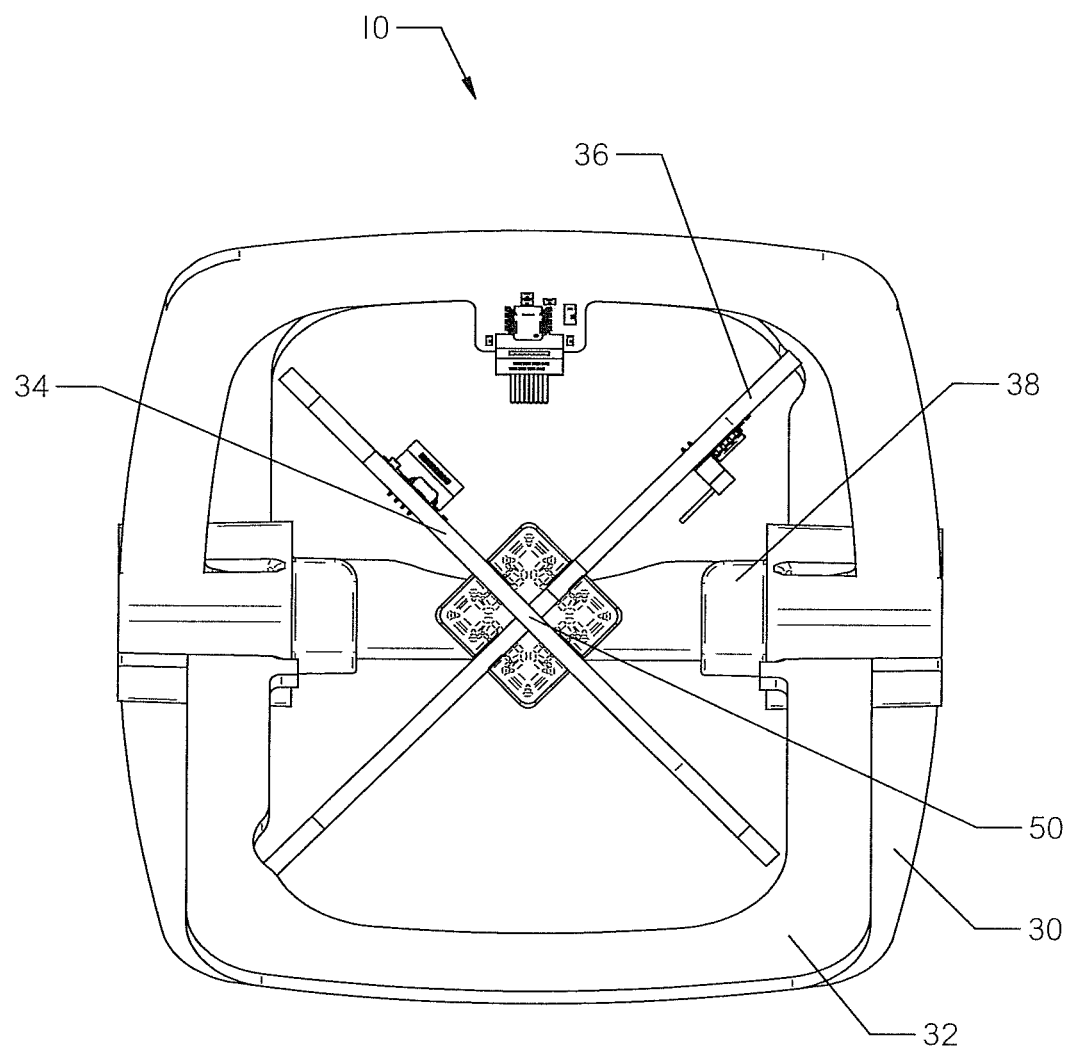
FIG. 7 is a back elevation view of the antenna arrangement of FIG. 3.
Figure 8:
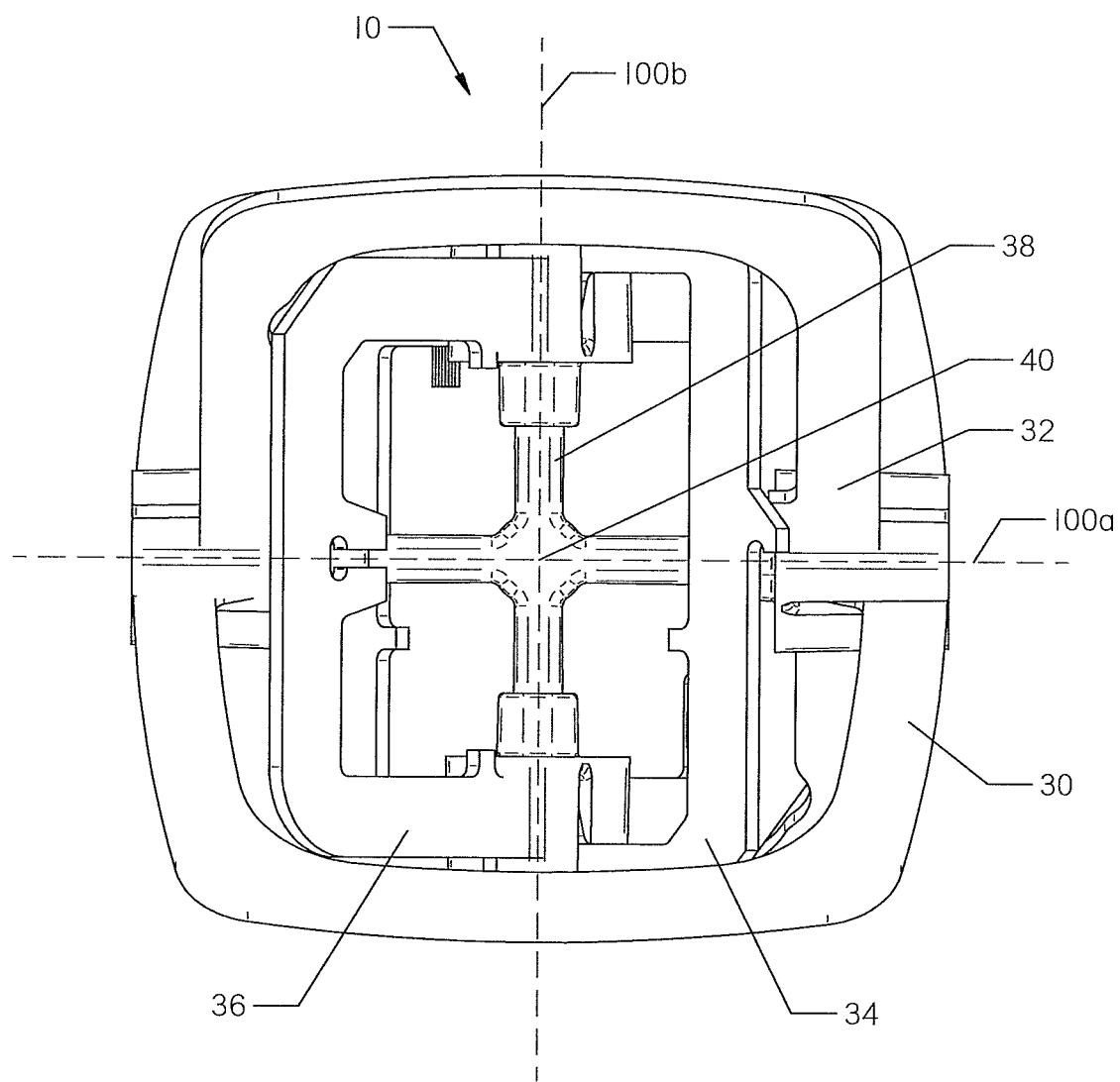
FIG. 8 is a bottom plan view of the antenna arrangement of FIG. 3.
Figure 9:
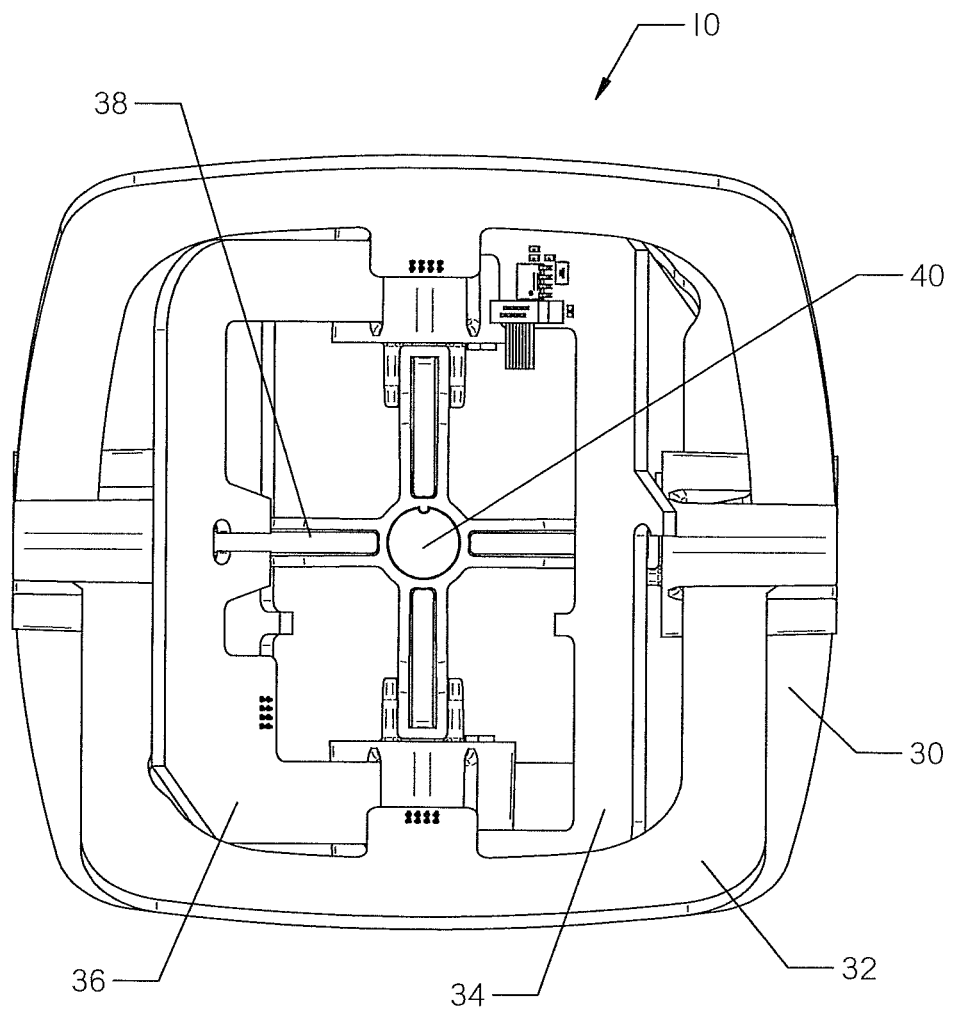
FIG. 9 is a top plan view of the antenna arrangement of FIG. 3.
Figure 10:
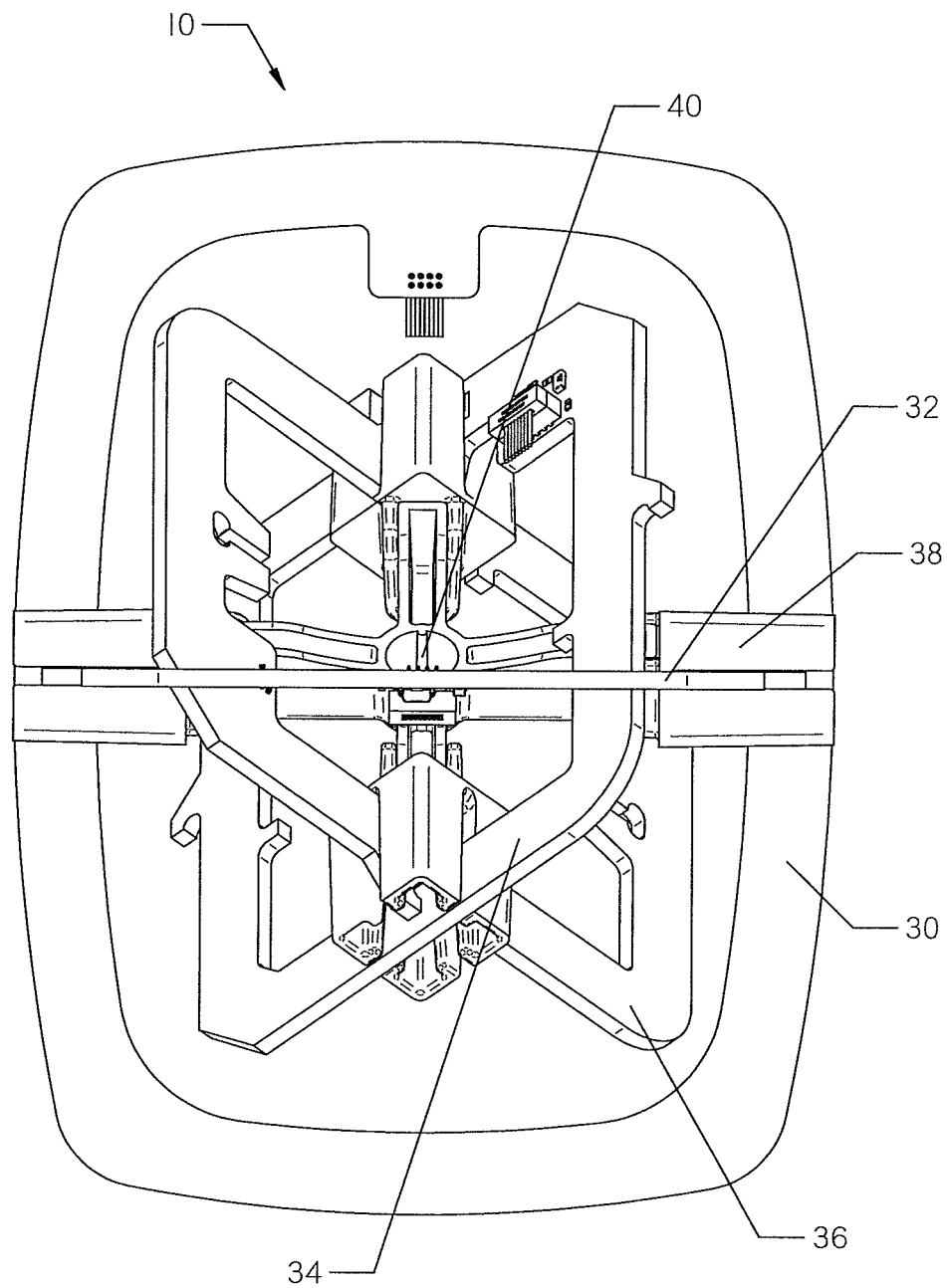
FIG. 10 is a top front perspective view of the antenna arrangement of FIG. 3.

With reference to FIGS. 3-10, the antenna arrangement 10 comprises four individual antennas: a first antenna 30, a second antenna 32, a third antenna 34, and a fourth antenna 36. The antennas 30, 32, 34, and 36 are held together in the antenna arrangement 10 via a support structure 38. The antennas 30, 32, 34, and 36 all have the same center point that corresponds with a center point 40 formed in the support structure 38, as shown in FIGS. 8-10. The support structure 38 may be formed of plastic. In alternative embodiments, the support structure may be formed of a metal capable of shielding the antennas from electric fields. In any case, each of the antennas 30, 32, 34, 36 is electrically independent from the others.

Figure 4:
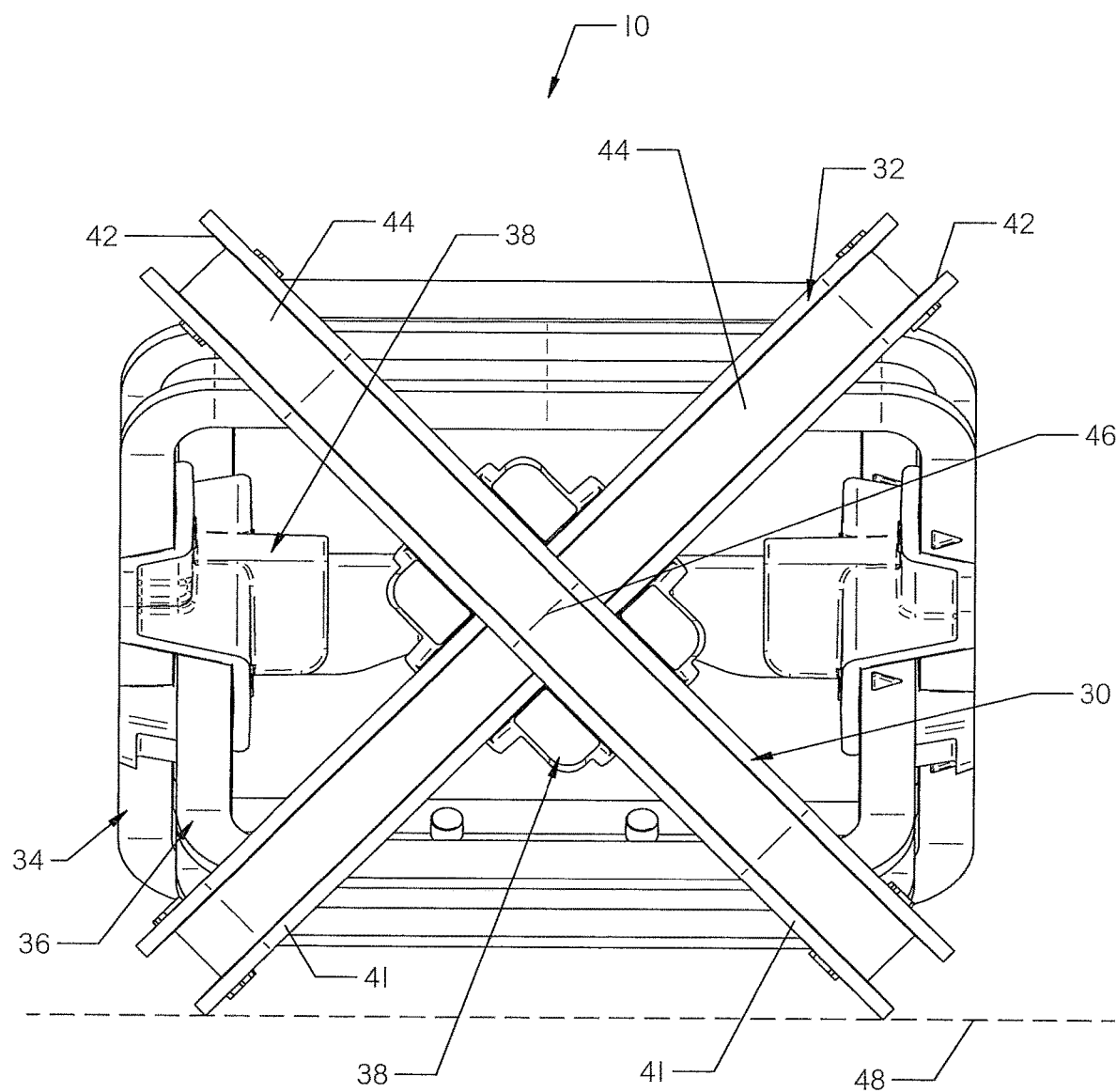
FIG. 4 is a left side elevation view of an alternative antenna arrangement utilizing four loop antennas of magnet wire.

Each of the antennas 30, 32, 34, and 36 is a printed circuit board (PCB) antenna. Printed circuit board antennas are fabricated using microstrips (not shown) on a circuit board frame 60. Alternatively, as shown in FIG. 4, each of the antennas 30, 32, 34, and 36 may be a coil 44 of magnet wire wound on a frame 41 having the cross-sectional shape of a hollow rectangle having radius corners. The frame 41 may be made of the same material as the support structure 38. The coil 44 of magnet wire, such as litz wire, is positioned within an externally-facing groove 42. Each coil 44 may be wound in only one direction. The coils 44 may be covered with a copper spray or tape to help insulate the coils from electric fields.

Figure 3:
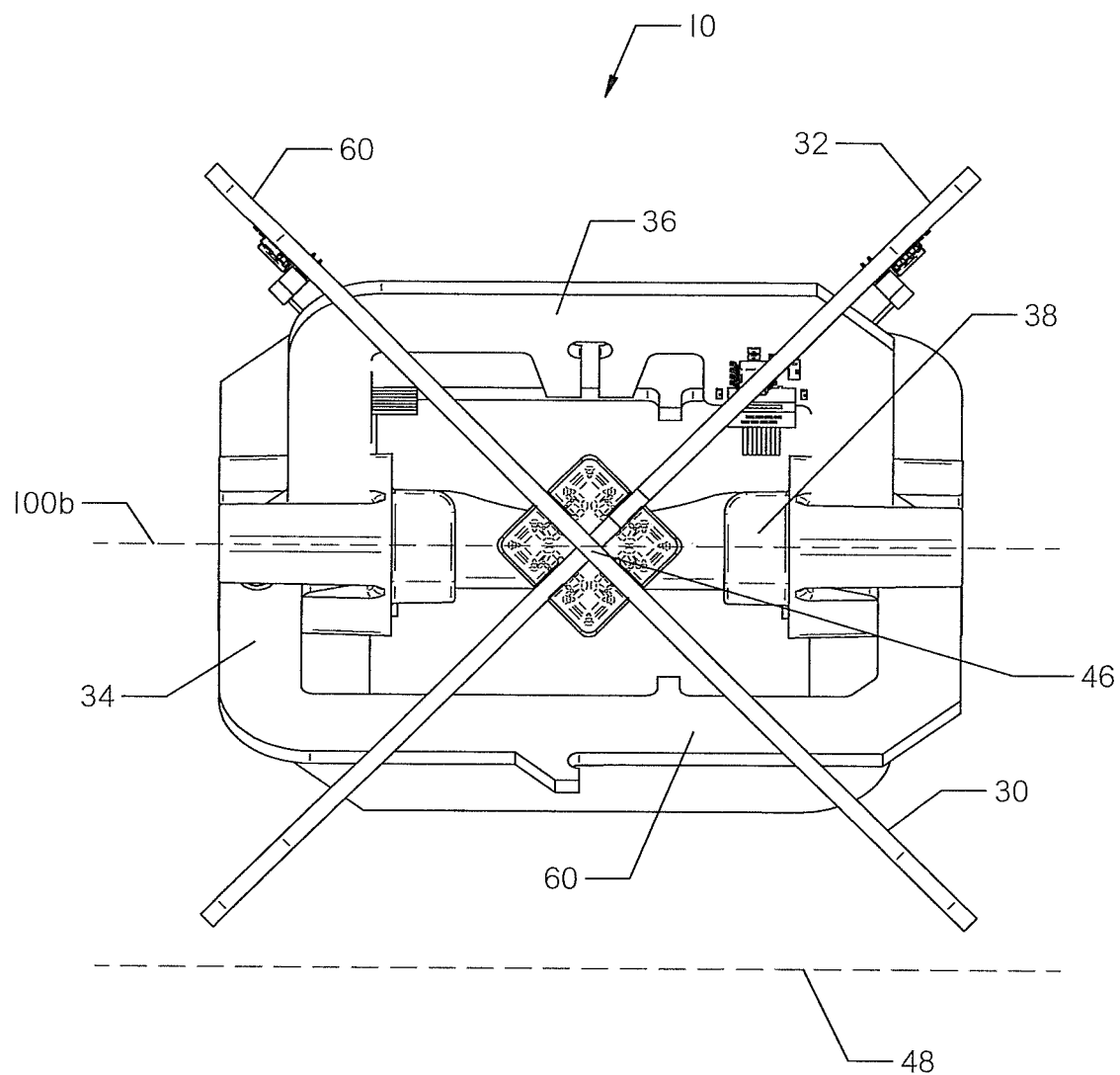
FIG. 3 is a left side elevation view of an antenna arrangement of the present invention utilizing four printed circuit board antennas.

PCB antennas, such as shown in FIGS. 3, and 5-11, have some advantage over coils 44 of magnet wire, as they may be made to precision specifications, without the need for the tolerances associated with winding the magnet wire into coils 44. However, the geometries of the assemblies to shown in FIG. 3 and FIG. 4 are similar, and discussion of the PCB antennas below also applies to coil-type antennas.

In either configuration, the antenna may be referred to as conductive loops, having an aperture defined within the conductive loop.

Figure 5:
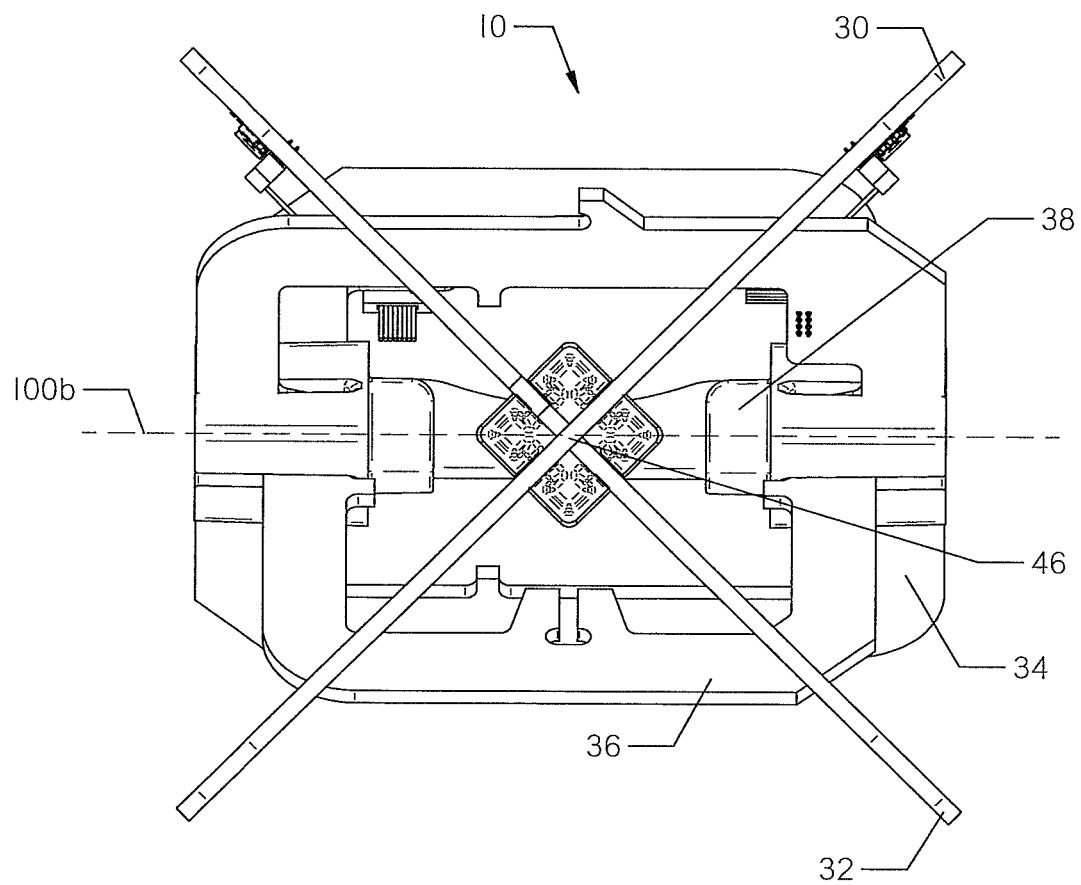
FIG. 5 is a right side elevation view of the antenna arrangement of FIG. 3.

Continuing with FIGS. 3, and 5-11, the first antenna 30 circumvents the second antenna 32 such that the antennas are perpendicular to one another. The first antenna 30 overlaps the second antenna 32 at two first points 46, as shown in FIG. 3 and FIG. 5. The two first points 46 are connected by a first reference line 100a. (FIG. 6) The planes in which the first 30 and second 32 antennas are situated meet at reference line 100a. The first and second antennas 30 and 32 are held by the support structure 38 such that each antenna 30 and 32 sits at a 45 degree angle with respect to a horizontal plane 48, as shown in FIG. 3.

The third antenna 34 circumvents the fourth antenna 36 such that the antennas 34 and 36 are perpendicular to one another. The third antenna 34 overlaps the second antenna 36 at two second points 50, as shown in FIGS. 6-7. The two second points 50 are connected by a second reference line 100b (FIG. 8). The planes in which the third 34 and fourth 36 antennas are situated meet at reference line 100b. The third and fourth antennas 34 and 36 are held by the support structure 38 such that each antenna 34 and 36 sits at a 45 degree angle with respect to the horizontal plane 48, as shown in FIG. 6.

While the each antenna pair 30, 32 and 34, 36 is at a 45 degree angle with respect to horizontal, the balancing aspect of the antenna arrangement 10 may be functional at alternate angles to the horizontal plane 48. Preferably, each antenna of a given pair are at the same angle relative to the horizontal plane 48.

The third and fourth antennas 34 and 36 are positioned inside of the first and second antennas 30 and 32 such that the second antenna 32 circumvents the third antenna 34. The first and second antennas 30 and 32 have a larger aperture area than the third and fourth antennas 34 and 36. As shown in FIG. 8, the first reference line 100a and second reference line 100b are perpendicular. If reference lines 100a, 100b are perpendicular, and the antenna arrangement 10 is oriented such that the second reference line 100b is parallel to the beacon length (roughly the orientation of the drill string 18), then the first 30 and second 32 antennas detect the vertical component of the field, and the component of the field parallel to the beacon 24. The third 34 and fourth 36 antennas detect the vertical component of the field, and the component of the field perpendicular to the beacon 24.

The antenna arrangement 10 described in the figures is different from antenna arrangements known in the art that typically consist of three separate and orthogonal antennas oriented in Cartesian alignment (x, y, and z). That is, each of the three orthogonal antennas is disposed in a plane which sits at a ninety degree angle to each of the other two. Each antenna of such arrangement detects the beacon signal on a different axis. The "z" axis corresponds to up-down direction of the beacon signal, and the "x" and "y" axes correspond to the right-left, forward-backward direction of the beacon signal. Such an antenna arrangement is shown in U.S. Pat. No. 7,786,731, issued to Cole, et al., the contents of which are incorporated herein by reference.

Such antenna arrangements detect a position of the beacon 24 by finding the "null" points in the transmitted field. The "null" point occurs when the only component being read by the tracker 12 is the "z" axis or the vertical axis. Thus, when the tracker 12 is at the "null" point, the antenna detecting the "z" axis has a signal, but the antennas detecting the "x" and "y" axes have no signal. Such signal readings indicate that the tracker 12 is in-line with the borepath, but either ahead of or behind the beacon 24. Thus, the "null" points occur at two locations on the beacon's transmitted field—one in front of the beacon 24 and one behind.

Since noise is always present in the field, it can be difficult to get the antenna components detecting the "x" and "y" axes to read "no signal". This difficulty leads to discrepancies and variation when trying to find the "null" points. This situation also occurs directly over the beacon 24. Because it is difficult to get the antenna components to ever receive "no signal", the user must interpret the data to find the location of the beacon 24 and "null" points.

In the present embodiment, the antenna arrangement 10 detects the position of the beacon 24 underground by digitally balancing the signals received by each set of paired antennas—first and second antennas 30, 32 and third and fourth antennas 34, 36. Digitally balancing the antenna signals means that when a given signal is generated completely in the "null" axis, all signals generated by the antennas will read the same to the processor, and therefore the user. Thus, at a null, where previously components of the dipole field were merely parallel (and therefore theoretically invisible) to two of the antennas, in the antenna arrangement 10 of the present invention, the third and fourth antennas will detect equal signals, and the first and second antennas will detect equal signals.

Prior to operation, the antennas 30, 32, 34, and 36 may be digitally balanced by placing the arrangement 10 in a fixture and driving a "null" field through them. The processor will read each antenna signal and create a balance matrix through which all future readings will be multiplied through to normalize the antenna signals.

Rather than detecting the beacon signal on three axes (x, y, and z), the antennas 30, 32, 34, and 36 each detect, in pairs, a particular balance of the magnetic field radiated from the beacon 24. The first and second antennas 30 and 32 detect the forward and backward direction of the field along the borepath, and the third and fourth antennas 34 and 36 detect the side-to-side balance of the field at the centerpoint 40 of the antenna arrangement 10.

Figure 11:
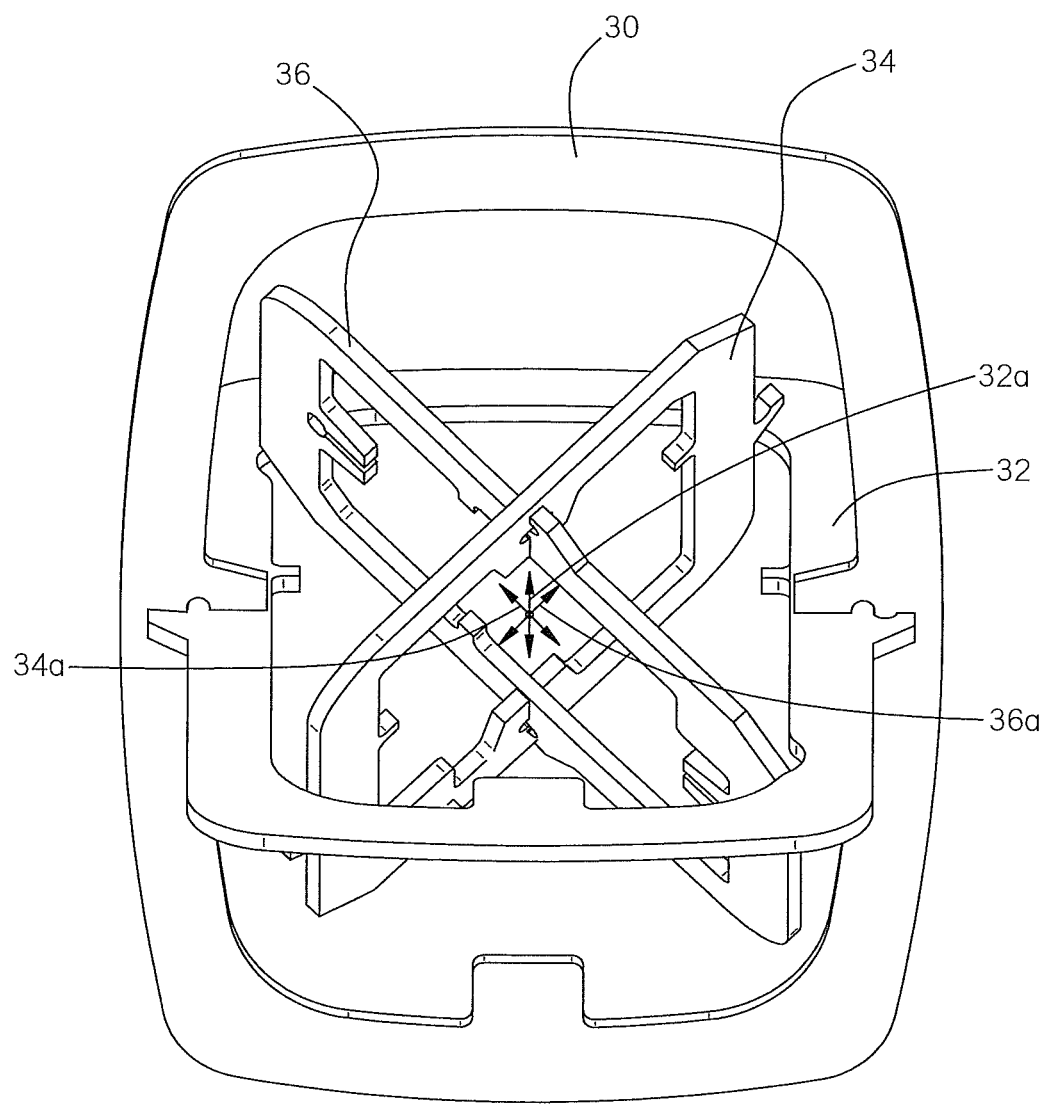
FIG. 11 is a top front perspective view of the antenna arrangement of FIG. 3.
Figure 12A:
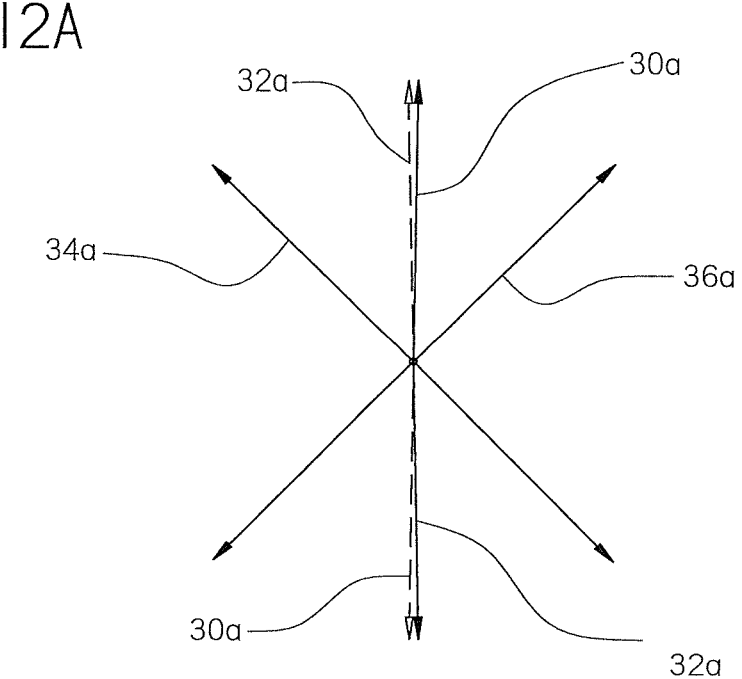
FIG. 12A is a diagram showing the normal vectors of the antenna components disposed from the front, or as oriented in FIG. 6. The angle is slightly offset so that normal vectors 30a and 32a are distinct.
Figure 12B:
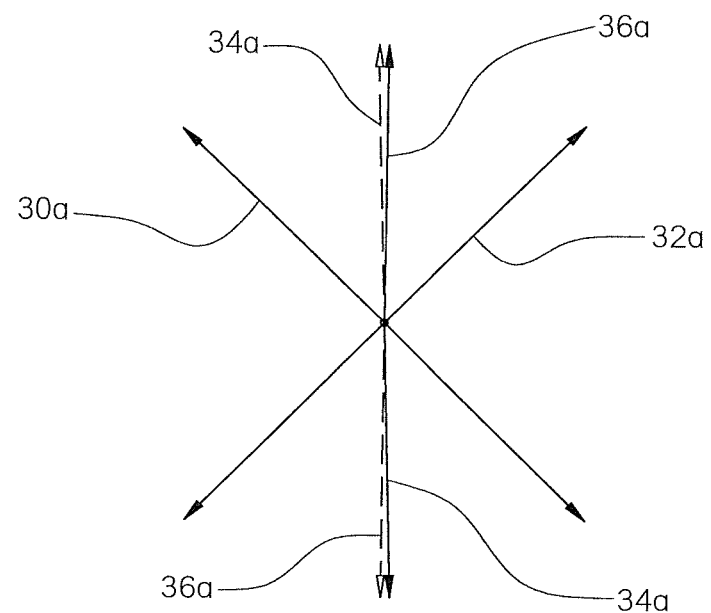
FIG. 12B is a diagram showing the normal vectors of the antenna components disposed from the right, or as oriented in FIG. 5. The angle is slightly offset so that normal vectors 34a and 36a are distinct.
Figure 12C:
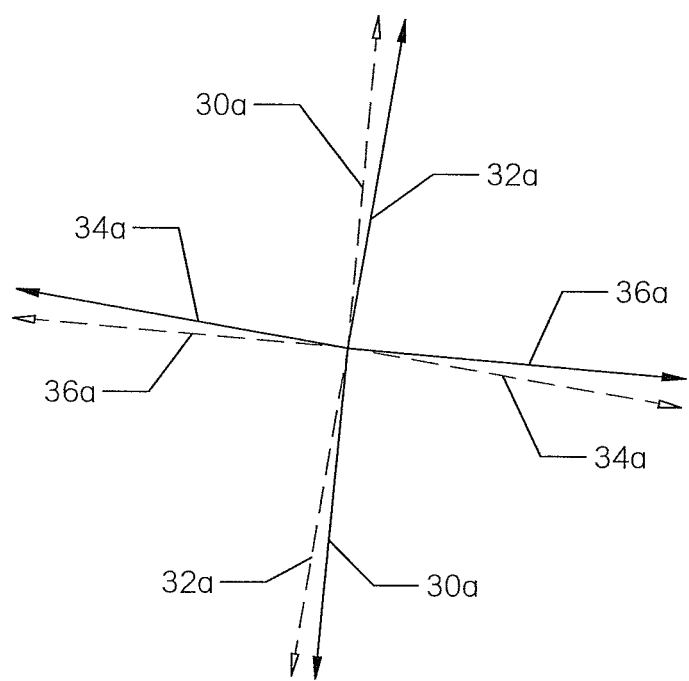
FIG. 12C is a diagram showing the normal vectors of the antenna components disposed from the top, or as oriented in FIG. 9. The angle is slightly offset so that normal vectors 34a and 36a are distinct and normal vectors 30a and 32a are distinct.

As shown in FIG. 11, each antenna 30, 32, 34, 36 has a distinct corresponding normal vector 30a, 32a, 34a, 36a. In FIG. 11, axis 30a extends directly out of the page. Each normal vector 30a-36a is perpendicular to the aperture of its corresponding antenna 30-36, and passes through the common centerpoint 40. FIGS. 12A, 12B, and 12C show these normal vectors 30a, 32a, 34a, 36a without the structure of the antenna arrangement 10 from the front, left and top respectively. When the paired antennas are orthogonal, as in FIGS. 3, 5-11, the normal vectors of each pair will be perpendicular.

While orthogonal antenna pairs are shown here, it should be understood that, so long as the angles between each antenna of a pair and the horizontal plane 48 are equal and opposite, other orientations of antenna pairs (that is, antennas 30, 32 on one hand, and antennas 34, 36 on the other) may be used to balance the signals and perform the tracking operation disclosed herein.

The discrepancies in signal strength between the first and second antennas 30 and 32 and between the third and fourth antennas 34 and 36 help the operator find the "null" point along the borepath. Thus, the pairs of antennas 30 and 32 and 34 and 36 work to guide the operator 28 in two dimensions to a position directly over the "null" point.

None of the antennas 30, 32, 34, and 36 directly detect the field on a vertical or "z" axis. Instead, the position of the beacon along the "z" axis is determined by a mathematical calculation of the beacon 24 location using signals detected by the antennas 30, 32, 34, and 36, each of which detect a component of the vertical field.

In operation, the tracker operator 28 is instructed which direction to move by commands displayed on the display 31 of the tracker 12. To start, the tracker operator 28 will turn on the tracker 12 and hold its handle parallel to the direction of the drill string 18, which should approximate the centerline of the transmitter on the beacon 24.

The display 31 will then provide the operator 28 with a direction to move. For example, if the first antenna 30 has a different signal than the second antenna 32, the monitor will direct the operator 28 to move the tracker 12 forwards or backwards until the two signal strengths are balanced. Likewise, if the third antenna 34 has a different signal than the fourth antenna 36, the monitor will direct the operator 28 to move the tracker 12 right or left until the two signal strengths are balanced.

A similar situation is presented when the tracker 12 is positioned directly over the beacon 24. When perfectly over the beacon antenna, the second antenna 32 is balanced with the first antenna 30. If the operator moves the tracker 12 forward, the second antenna 32 will have higher signal strength than the first antenna 30, indicating that the tracker should move backwards. The opposite scenario plays out if the tracker 12 moves behind the beacon 24.

When the tracker 12 arrives at the "null" point, all four antennas 30, 32, 34, and 36 are balanced. The tracker 12 notifies the operator 28 of such arrival on the monitor. The operator 28 then marks position of the first "null" point found and attempts to find the second "null" point using the same balancing method. Once the operator 28 has found both "null" points, the operator will walk the line between the null points until the first and second antennas 30 and 32 are again balanced. At this point, the tracker 12 will indicate to the operator 28 that the tracker 12 is positioned directly over the beacon 24. The total field will then be calculated to determine the depth of the beacon 24.

The total field may be calculated using the mathematical formulas and methods described in U.S. Pat. No. 9,329,297, titled Dipole Locator Using Multiple Measurement Points, issued to Cole, the entire contents of which are incorporated herein by reference. Likewise, the processor may interpret the signals detected by the antennas using the coding techniques described in the '297 patent.

The measurement of the "z"-axis field, described in the '297 patent, is not directly available, as no single antenna 30, 32, 34, 36 receives all of the "z" field as in that application. However, the "z"-field can be readily calculated from computing the component vectors in the "z" direction.

Therefore, assuming the tracker 12 is over the beacon 24 and oriented properly, each pair of antennas will receive a component of the "z" field. The vector sum can be calculated using the components calculated, giving the total field for the purposes of the measurements disclosed in Cole and incorporated herein.

In addition, amplitude modulation, that is, varying the signal strength of the beacon signal, may be used to interpret the signals received by the antenna. Alternatively, or in conjunction with amplitude modulation, phase modulation may also be used with the antenna arrangement 10 to interpret the antenna signals.

In operation, none of the antennas 30, 32, 34, and 36 will approach the noise floor. Rather, ambient noise is present in all of the antennas 30, 32, 34, and 36. However, since the antenna arrangement 10 focuses on balancing signals rather than minimizing signals, the present noise interferes less with finding the "null" points.

Changes may be made in the construction, operation and arrangement of the various parts, elements, steps and procedures described herein without departing from the spirit and scope of the invention as described in the following claims.

The invention claimed is:

1. An above-ground antenna arrangement comprising:
a first conductive loop;
a second conductive loop, surrounded by the first conductive loop;
a third conductive loop; and
a fourth conductive loop, surrounded by the third conductive loop;
in which each of the first, second, third and fourth conductive loops are planar and define separate planes; and
in which each of the first, second, third and fourth conductive loops have a common centerpoint; and
in which the planes of the first and second conductive loops intersect at a first line and the planes of the third and fourth conductive loops intersect at a second line;
wherein the first line and second line are in spaced relationship.

2. A system, comprising:
the antenna arrangement of claim 1; and
a beacon disposed at a below-ground location and generating a dipole magnetic field about its length;
wherein the antenna arrangement is receiving the field generated by the beacon.

3. The system of claim 2 further comprising:
a horizontal directional drill;
a drill string coupled to the horizontal directional drill having a first end and a second end;
in which the horizontal directional drill is coupled to the drill string at the first end; and
in which the beacon is disposed at the second end of the drill string.

4. A method comprising:
using the system of claim 3, advancing the drill string and beacon; and thereafter, moving the antenna arrangement to a position on a surface of the ground where the strengths of the magnetic dipole field detected by the first and second conductive loops are equal, and where the strengths of the magnetic dipole field detected by the third and fourth magnetic loops are equal.

5. The method of claim 4 further comprising orienting the antenna arrangement such that the planes in which the third and fourth conductive loops are situated are parallel to the length of the beacon.

6. An antenna assembly having a first, a second, a third, and a fourth conductive loop, each of the first, second, third and fourth conductive loops situated within a single plane and having a center, in which the centers of the four loops coincide and which none of the planes of the four loops coincide,
wherein the first and second conductive loop intersect at a first reference line and the third and fourth conductive loop intersect at a second reference line, the first and second reference lines being non-parallel.

7. The antenna assembly of claim 6 in which the planes of the first and second conductive loops are orthogonal.

8. The antenna assembly of claim 7 which the planes of the third and fourth conductive loops are orthogonal.

9. An antenna assembly, comprising:
a first conductive loop situated in a first plane and defining a first normal vector, normal to the first plane and extending through a centerpoint of the first conductive loop;

a second conductive loop situated in a second plane and defining a second normal vector, normal to the second plane and extending through a centerpoint of the second conductive loop;

a third conductive loop situated in a third plane and defining a third normal vector, normal to the third plane and extending through a centerpoint of the third conductive loop;

a fourth conductive loop situated in a fourth plane and defining a fourth normal vector, normal to the fourth plane and extending through a centerpoint of the fourth conductive loop;

in which the centerpoints of the first, second, third and fourth conductive loops are coincident; and in which the first, second, third and fourth normal vectors are distinct and not co-planar.

10. The antenna assembly of claim 9 in which each of the first, second, third and fourth conductive loops are supported on a printed circuit board.

11. The antenna assembly of claim 9 in which each of the first, second, third and fourth conductive loops comprise coils of conductive wire.

12. The antenna assembly of claim 9 in which:
the first normal vector and the second normal vector are perpendicular; and
the third normal vector and the fourth normal vector are perpendicular.

13. A method of using the antenna assembly of claim 5, comprising:
generating a dipole magnetic field at an underground location to which the antenna assembly is responsive;
moving the antenna assembly within the magnetic field to an above ground location where the field strengths detected by the first and second conductive loops are equal and the field strengths detected by the third and fourth conductive loops are equal.

14. The method of claim 13 further comprising:
after moving the antenna assembly to the above ground location, detecting a magnitude of the magnetic dipole field at the above ground location.

15. An antenna, comprising:
a first conductive loop having a center;

a second conductive loop, electrically independent of the first conductive loop, the second conductive loop having a center that coincides with the center of the first conductive loop;

a third conductive loop having a center, the third conductive loop electrically independent of the first and second conductive loops; and a fourth conductive loop, electrically independent of the first, second and third conductive loops, and having a center that coincides with the center of the third conductive loop;

in which the first conductive loop surrounds the second conductive loop; in which the third conductive loop surrounds the fourth conductive loop;

in which the planes of the first and second loops intersect at a first line;

in which the planes of the third and fourth loops intersect at a second line; and in which the first line and the second line are perpendicular.

16. The antenna of claim 15 in which the centers of the first, second, third and fourth conductive loops coincide.

17. The antenna of claim 15 in which each loop is characterized by a plane that contains its perimeter, and in which the planes of the first and second loops are orthogonal.

18. The antenna of claim 17 in which the planes of the third and fourth loops are orthogonal.

19. The antenna of claim 15 in which the second conductive loop surrounds the third conductive loop.

20. The antenna arrangement of claim 1, in which:
the antenna array is situated relative to a reference plane;
the plane of the first loop is situated at an equal and opposite angle relative to the reference plane as the plane of the second loop; and
the plane of the third loop is situated at an equal and opposite angle relative to the reference plane as the plane of the fourth loop.

21. The antenna arrangement of claim 20 in which the reference plane is horizontally oriented.

* * * * *

UNITED STATES PATENT AND TRADEMARK OFFICE
CERTIFICATE OF CORRECTION

| | |
|---|---|
| PATENT NO. | : 11,204,437 B2 |
| APPLICATION NO. | : 16/672937 |
| DATED | : December 21, 2021 |
| INVENTOR(S) | : Cole et al. |

It is certified that error appears in the above-identified patent and that said Letters Patent is hereby corrected as shown below:

In the Specification

Column 2, Line 62, please delete "to" and insert --10--.

In the Claims

Column 6, Claim 8, Line 1, after "7" please insert --in--.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*